United States Patent [19]

Bergstein

[11] Patent Number: 5,333,996
[45] Date of Patent: * Aug. 2, 1994

[54] DUAL FLUID ROTOR APPARATUS

[76] Inventor: Frank D. Bergstein, 1201 Edgecliff Pl., Cincinnati, Ohio 45206

[*] Notice: The portion of the term of this patent subsequent to Sep. 21, 2010 has been disclaimed.

[21] Appl. No.: 113,275

[22] Filed: Aug. 27, 1993

Related U.S. Application Data

[63] Continuation-in-part of Ser. No. 911,123, Jul. 9, 1993, Pat. No. 5,246,342.

[51] Int. Cl.⁵ ............................................. F01D 13/00
[52] U.S. Cl. .................... 416/197 A; 415/3.1; 415/4.4
[58] Field of Search ............... 415/2.1, 3.1, 4.2, 4.4; 416/197 A, 223 R

[56] References Cited

U.S. PATENT DOCUMENTS

| | | | |
|---|---|---|---|
| 246,977 | 9/1881 | Purper . | |
| 372,148 | 10/1887 | Henderson | 415/4.2 |
| 377,602 | 2/1888 | Cooper . | |
| 543,909 | 8/1895 | Thompson . | |
| 591,962 | 10/1897 | Evison . | |
| 692,714 | 2/1902 | Sala et al. | 416/197 A |
| 764,571 | 7/1904 | Fisher . | |
| 1,200,308 | 10/1916 | Bunnell | 416/197 A |
| 1,217,684 | 2/1917 | Barker . | |
| 1,471,095 | 10/1923 | Bonetto . | |
| 1,647,461 | 11/1927 | Miller | 415/3.1 |
| 1,677,745 | 7/1928 | Bonetto | 415/4.2 |
| 1,811,565 | 6/1931 | Schwabacher | 415/3.1 |
| 1,963,196 | 6/1934 | Frisch . | |
| 2,252,788 | 8/1941 | Sparr | 416/197 A |
| 3,267,833 | 8/1966 | Artis | 416/197 A |
| 4,017,204 | 4/1977 | Sellman . | |
| 4,355,958 | 10/1982 | Cornick . | |
| 4,474,529 | 10/1984 | Kinsey . | |
| 4,960,363 | 10/1990 | Bergstein | 415/3.1 |
| 5,088,884 | 2/1992 | Bergstein | 415/3.1 |
| 5,133,637 | 7/1992 | Wadsworth | 415/4.4 |
| 5,246,342 | 9/1993 | Bergstein | 416/197 A X |

FOREIGN PATENT DOCUMENTS 396012 4/1933 United Kingdom ........... 416/197 A Primary Examiner—Edward K. Look
Assistant Examiner—Michael S. Lee
Attorney, Agent, or Firm—Frost & Jacobs

[57] ABSTRACT

A fluid rotor is disclosed for turning electrical generators or other mechanical equipment. The fluid rotor contains multiple curved blades which are in a single plane of rotation, and which are spaced closely together so as to maximize the efficiency of the captured fluid. The open blades are designed to overlap one another to an extent that there are always at least two blades positioned to capture the fluid regardless from which direction the fluid is flowing. The curved blades allow the rotor to always rotate in the correct direction regardless of the direction of the fluid without the use of moving vanes or housings to help direct the fluid at certain portions of the fluid rotor. If the rotor is made to turn in the incorrect direction, it will, as fluid from any direction flows against it, slow down, stop momentarily, and then begin to rotate in the correct direction. More than one rotor can be used in a single assembly, and one rotor can be placed within a liquid such as water, and another rotor can be placed in a gas such as air. Both rotors are coupled to commonly drive a single output shaft, and the coupling uses a one-way clutch so that the liquid rotor cannot act as an anchor to prevent the gas rotor from turning.

17 Claims, 4 Drawing Sheets

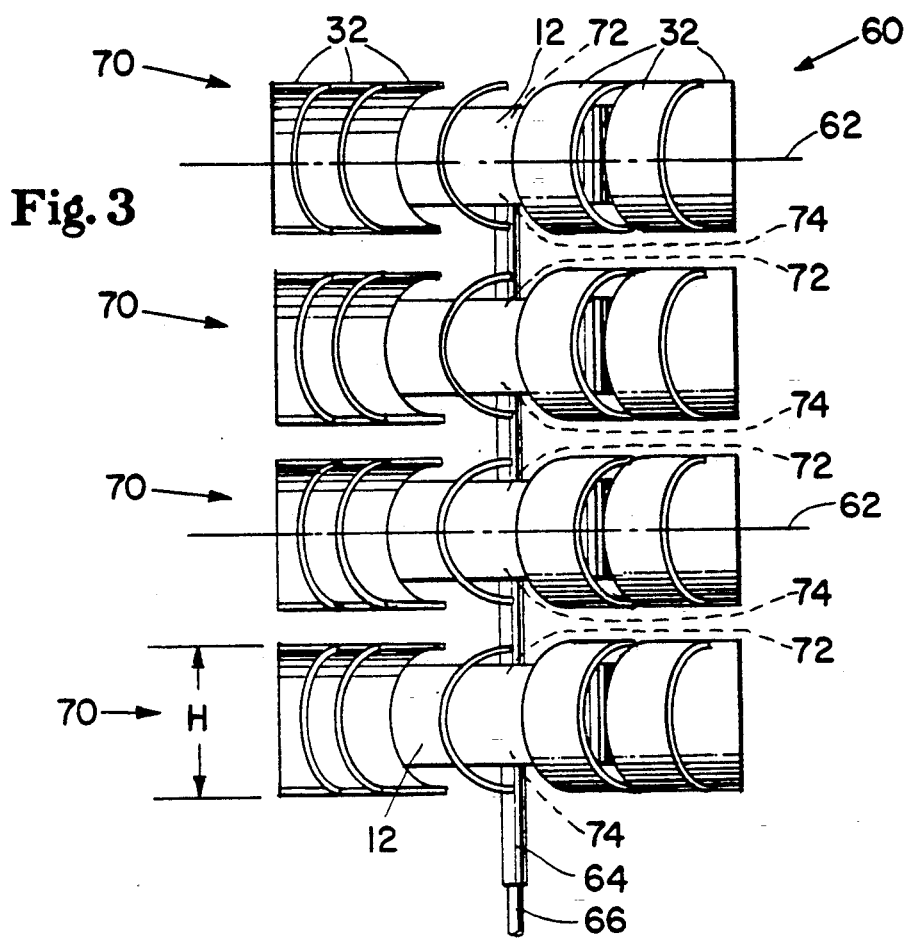
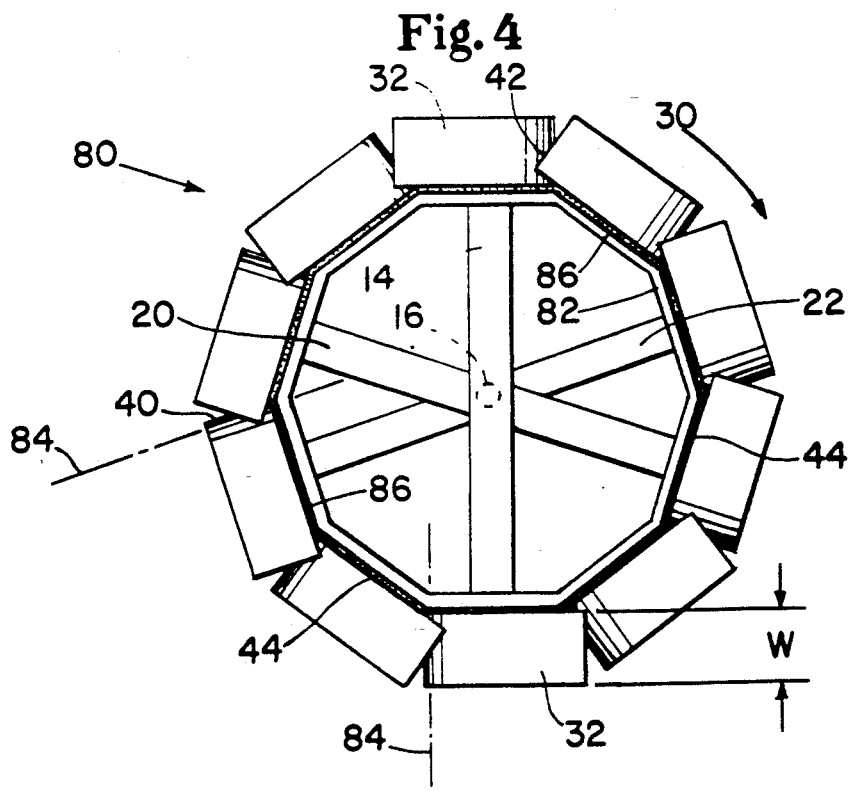

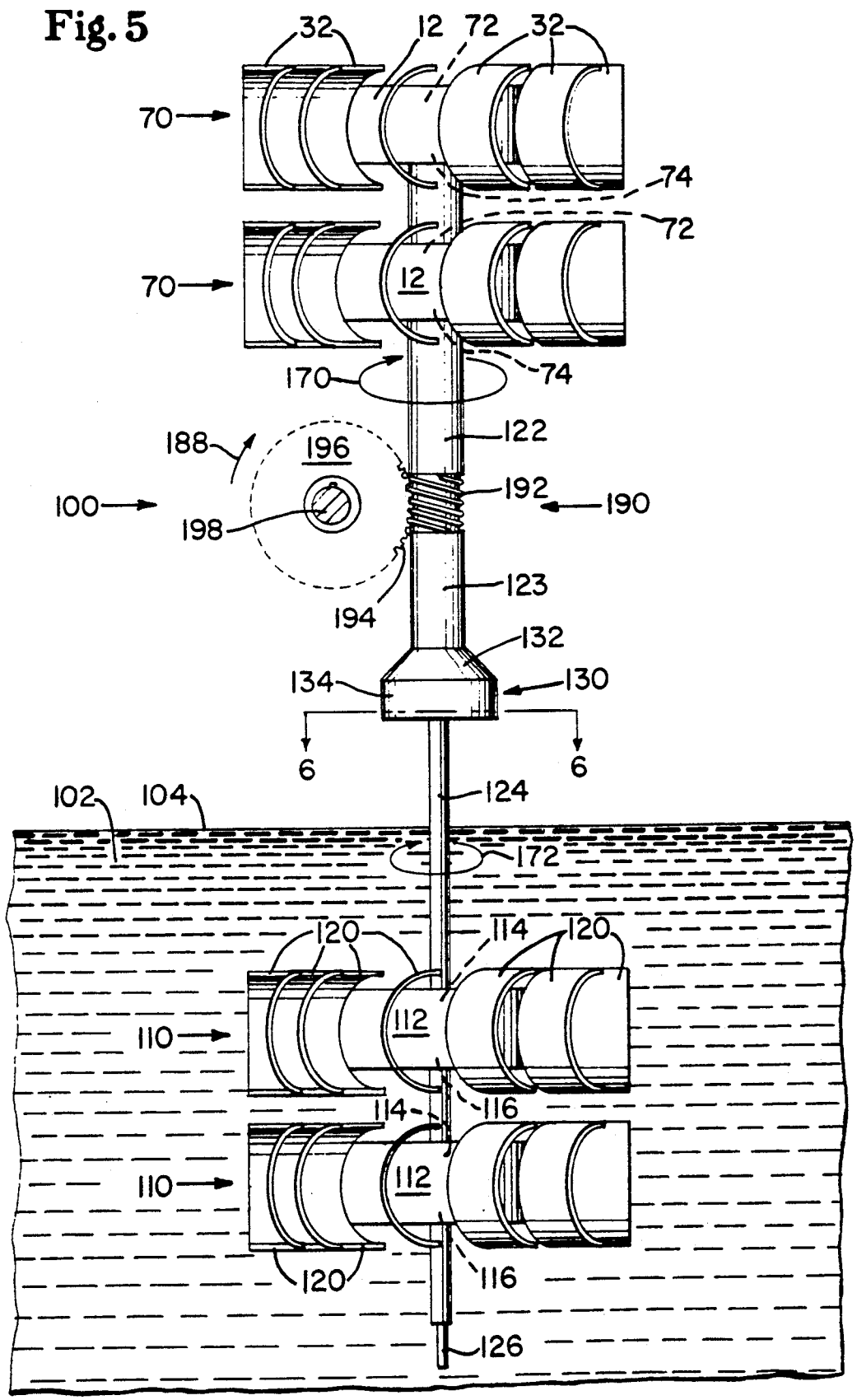

DUAL FLUID ROTOR APPARATUS

This in a continuation-in-part of co-pending U.S. patent application Ser. No. 07/911,123, filed on Jul. 9, 1993, now U.S. Pat. No. 5,246,342.

TECHNICAL FIELD

The present invention relates generally to fluid rotor equipment and is particularly directed to fluid rotors of the type which can be used to drive electrical generators, or other mechanical equipment. The invention will be specifically disclosed in connection with a rotor having multiple curved blades in one plane which are spaced closely together for maximizing the efficiency of the captured fluid.

BACKGROUND OF THE INVENTION

Fluid rotor machines (such as windmills and water wheels) are quite old in the art, and have been in use for centuries. Fluid rotor machines tend to work at their highest efficiency when the incoming fluid is flowing directly onto the movable blades or rotor, such that the direction of the fluid is perpendicular to the plane of blade movement as the blades rotate. Another way of describing this characteristic is that the direction of the fluid is parallel to the axis of rotation of the blades.

The method for directing the fluid onto the blades in the most efficient manner has varied from device to device in the past, and has lead to two basic methods of achieving this desired goal. In the first instance, a housing which surrounds the movable rotor and blades has a set of doors which are opened to allow the fluid into the rotor area. One example of this type of windmill with housing is disclosed in Cooper (U.S. Pat. No. 377,602) in which the housing has multiple doors which can be individually opened or closed to let in the fluid from the proper direction. The second common method for directing the fluid against the blades in a most efficient manner is to provide a windmill that has a relatively large tail (or vane) which automatically directs the blades into the fluid. This type of windmill is disclosed in Frisch (U.S. Pat. No. 1,963,196).

The two above methods of efficiently directing fluid against the rotor blades are combined in a patent disclosure by Bonerio (U.S. Pat. No. 1,471,095), in which the windmill system has a funnel-shaped housing that can be directed into the wind, by use of a top-mounted vane. This arrangement tends to collect a greater amount of the air in motion and condense it into a smaller cross-sectional area, thereby increasing its velocity at the points where the air passes the blades of the windmill.

Another windmill configuration is disclosed in Fisher (U.S. Pat. No. 764,571), in which a wind motor includes a main wind-wheel and an auxiliary wind-wheel. The apparatus is designed to be movable, either a automatically or otherwise, so that the wind-wheels always face squarely into the wind. In addition, an inclined deflector is provided to direct the wind onto the blades. The blades themselves have an overall scoop shape with open ends. The open end near the shaft permits the passage of wind from one blade to the next succeeding blade, which tends to the make the Fisher apparatus less efficient. Its relatively high complexity also tends to make it less reliable.

Many of the fluid rotor machines presently available require some type of movable device to insure that the blades are positioned to most efficiently collect the fluid as it arrives from various directions. The moving parts required for performing this function are a possible cause for maintenance problems and down-time. Some of the presently known fluid rotor machines also have housings which are themselves either movable, or have movable doors or openings which tend to direct fluid into the rotor and blade areas of the fluid rotor apparatus. Such movable parts, again, can be a cause for maintenance problems and down-time, and in addition cause the overall apparatus to be somewhat complex. Presently known fluid rotor devices become relatively useless if their movable parts fail to adequately perform to direct the fluid, or to move the overall rotor and blades, so that the fluid strikes the blades in an efficient manner.

SUMMARY OF THE INVENTION

Accordingly, it is a primary object of the present invention to provide a fluid rotor device which efficiently operates regardless of the direction of the fluid without need for any extraneous moving parts or fluid-funneling devices to improve its overall efficiency of operation.

It is another object of the present invention to provide a fluid rotor device which, if spinning in the incorrect direction for whatever reason, will, as fluid strikes the blades of the apparatus, slow down and stop, then start to turn in the correct direction of rotation.

It is a further object of the present invention to provide a fluid rotor device which contains multiple blades in a single plane of rotation which are closely spaced together without the blades interfering with one another, both mechanically and from a fluid flow standpoint.

It is yet another object of the present invention to provide a fluid rotor device which has a relatively small diameter as compared to the over all height of the rotating hub and blades.

It is still another object of the present invention to provide a fluid rotor device that includes more than one set of multiple blades, in which at least one set of blades is immersed in a liquid, such as water, and at least another set of blades rotates due to movement of a gas, such as air, and both set of blades provide mechanical movement into a common output shaft.

To achieve the foregoing and other objects, and in accordance with the purposes of the present invention as described herein, an improved fluid rotor device is provided having a cylindrically-shaped hub, which is supported by a vertical shaft, and having several closely spaced blades which are attached to the outer portions of the rotating hub. At least two cross-members are provided within the interior space of the hub, such cross-members having bearing surfaces by means of which they are attached to a vertical shaft. The vertical shaft is stationary and the cross-members and hub rotate about the shaft as one overall member. The multiple blades on the exterior surfaces of the hub are curved such that the longitudinal axis of each blade is perpendicular to the axis of rotation (i.e., the vertical shaft). Each of the curved blades is attached to the outer surface of the rotating hub at the apex of curvature of the blade, which is located near the trailing portion of each of the blades. The leading edges of each of the curved blades can overlap the trailing portions of the next adjacent upwind or upstream blade (depending upon the fluid medium), in a manner so that the blades can be spaced very closely together, thereby leading to high efficiency of energy transfer from moving fluid (gas or liquid) to rotational energy of the fluid rotor device.

In a modified fluid rotor assembly, more than one of the above fluid rotor devices is mounted upon a common vertical shaft, which rotates with the fluid rotor devices. Each of the fluid rotor devices can be constructed of curved blades which are of the same size, or curved blades of varying sizes, as efficiency and safety requirements allow for a given installation. Curved blades which are rather tall in vertical height can be used without increasing the overall diameter of the fluid rotor apparatus to a significant extent, by using blades having a different profile, i.e., increasing their height without substantially increasing their width. The number of layers of rotating hub and curved blade assemblies can be increased to achieve the overall power and torque required for a particular application. The only major constraint is the overall maximum height to be allowed at a particular installation.

In a further modification of the fluid rotor assembly, the rotor is nearly cylindrical in shape, having, however, multiple facets along its outer diameter such that a larger portion of each of the curved blades can be rigidly attached to each of the facets of the rotor. The shape of each of individual curved blade would not change as compared to cylindrical rotors, however, the shape of the rotor, as viewed from above, would be that of a decagon or dodecagon for a rotor-blade assembly having either ten blades or 12 blades, respectively.

In a yet further modification of the fluid rotor assembly, at least two of the above fluid rotor devices is mounted upon portions of a vertical shaft, in which one set of blades is immersed in a liquid such as water, and a second set of blades is driven by a gas such as air. Movement of liquid water, such as provided by the ocean near a beach or by a river, will tend to rotate the first set of fluid rotor blades, and movement of the air will tend to move the second set of fluid rotor blades. The movement of both sets of blades will propel a right angle drive assembly, and both sets of blades will contribute to turning a common output shaft. Both the liquid-driven rotor and the gaseous-driven rotor are each mounted on portions of a vertical shaft assembly, and a one-way clutch is located at the point where the two shaft portions join. If the liquid-driven rotor blades are not turning as quickly as the gaseous-driven rotary blades, the gaseous-driven rotor blades will be free to turn as the one-way clutch freewheels, and will not be slowed down by the slower liquid-driven rotor blades. If the liquid-driven rotor blades are turning more quickly than the gaseous-driven rotor blades, then the one-way clutch will force the gaseous-driven blades to rotate the same speed as the liquid-driven blades. In this latter mode of operation, both types of rotor blades will contribute to the torque provided to the common output shaft.

Still other objects of the present invention will become apparent to those skilled in this art from the following description wherein there is shown and described a preferred embodiment of this invention, simply by way of illustration, of one of the best modes contemplated for carrying out the invention. The objects and advantages of the invention may be realized and obtained by means of the instrumentalities and combinations particularly pointed out in the appended claims. As will be realized, the invention is capable of other different embodiments, and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated in and forming a part of the specification illustrate several aspects of the present invention, and together with the description serve to explain the principles of the invention. In the drawings:

FIG. 3 is an elevational view of a multi-layer fluid rotor assembly having four sub-assemblies, each of which are similar to the fluid rotor apparatus of FIG. 1, and all mounted upon a common rotating vertical shaft.

FIG. 4 is a plan view of a fluid rotor apparatus having a faceted hub, constructed in accordance with the principles of the present invention.

FIG. 5 is an elevation view of a multi-layer fluid rotor assembly having four sub-assemblies, each of which are similar to the fluid rotor apparatus of FIG. 1, in which two of the four sub-assemblies are immersed in a liquid, and two of the four sub-assemblies are immersed in a gaseous medium.

DETAILED DESCRIPTION OF THE PREFERRED EMBODIMENT

Reference will now be made in detail to the present invention, examples of which are illustrated in the accompanying drawings, wherein like numerals indicate the same elements throughout the views.

Figure 1:
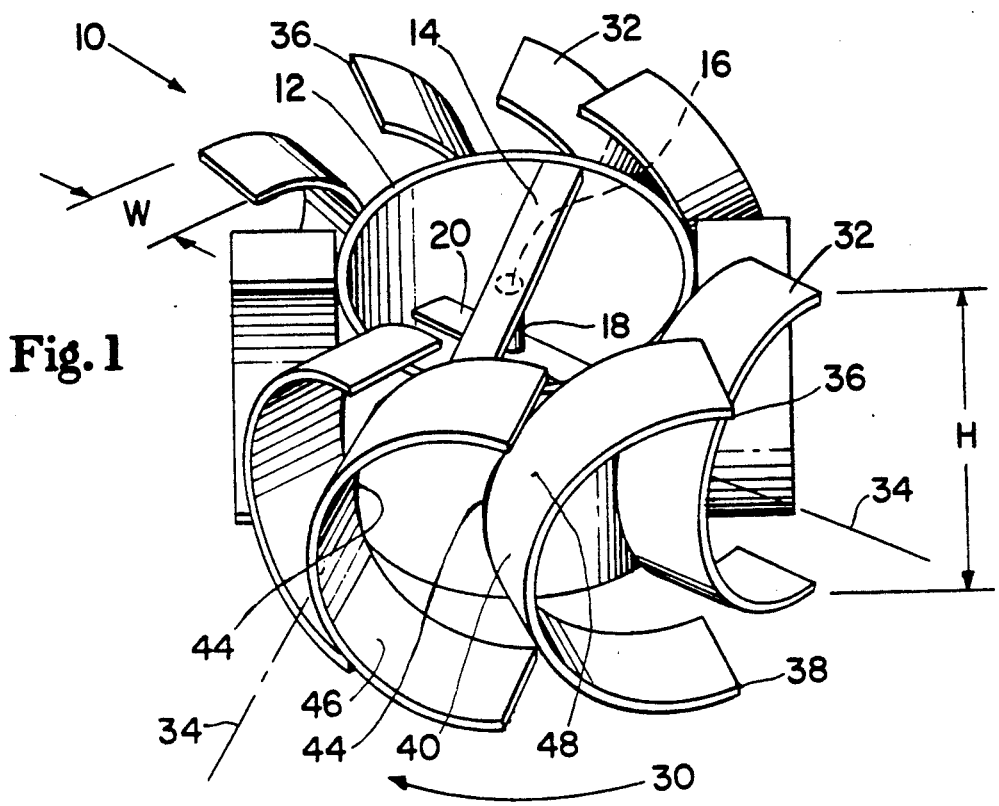
FIG. 1 is a perspective view of a fluid rotor apparatus having a cylindrical hub, constructed in accordance with the principles of the present invention.
Figure 2:
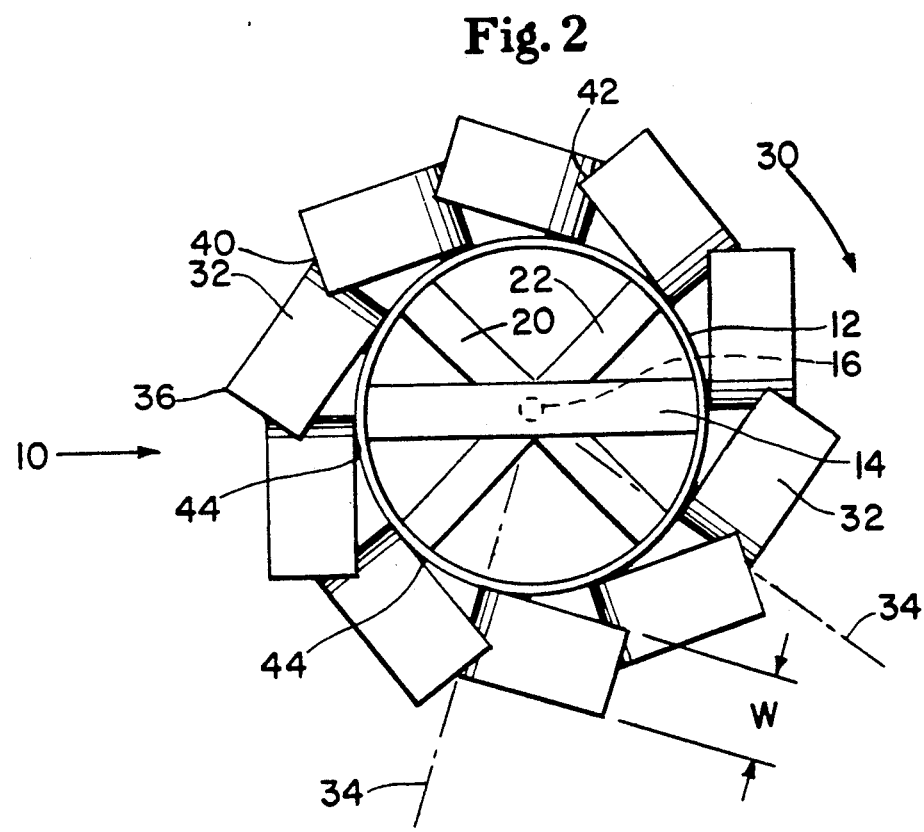
FIG. 2 is a plan view of the fluid rotor apparatus of FIG. 1.

Referring now to the drawings, FIGS. 1 and 2 shows a fluid rotor assembly generally designated by the numeral 10, having a cylindrical central hub 12, cross-members 14, 20 and 22, and a plurality of curved blades 32. The entire fluid rotor assembly 10 is rotatably attached to a vertical shaft 18. The middle cross-member 20 and bottom cross-member 22 have holes at their center through which vertical shaft 18 extends. Such holes are sized to provide bearing surfaces between cross-members 20 and 22 and the vertical shaft 18.

Top cross-member 14 does not have a hole at its center, but instead has a bearing surface at the location designated by the numeral 16 which rides along the top of vertical shaft 18. The tip of vertical shaft 18 (at location 16) is preferably made of a self-lubricating plastic material, which bears against the bottom surface of top cross-member 14. This bottom surface consists preferably of metallic material, such as brass, to prevent wear. This type of vertical shaft mounting configuration is known in the art, and is disclosed in U.S. Pat. No. 4,960,363 and No. 5,088,884, both by Bergstein. It will be understood that a U-frame or other method of mounting could be used to hold rotor assembly 10 vertically in place, rather than the use of a vertical shaft 18.

The entire fluid rotor assembly 10 turns as one unit in the direction of rotation designated by the arrow 30. The bearing surfaces of cross-members 14, 20 and 22 allow the fluid rotor assembly 10 to rotate while the vertical shaft 18 remains stationary.

In the illustrated embodiment of fluid rotor assembly 10, each of the curved blades 32 has a semi-circular shape, as viewed from the horizontal. Each of the blades 32 has an upper leading edge 36, a lower leading edge 38, and an apex of curvature, designated by the numeral 40. Whereas the apex 40 is the leading portion of each blade 32 as blade 32 rotates about vertical shaft 18, the fluid flow of the wind or liquid flow will always first intersect the upper and lower edges 36 and 38, respectively, of a given blade 32 as that blade 32 faces into the direction of the wind or liquid flow. Therefore, edges 36 and 38 have been designated as "leading edges."

The longitudinal axis at the apex 40 of each blade 32 is indicated by the broken line 34. Each of the longitudinal axes 34 at the apexes 40 of the blades 32 is perpendicular to the axis of rotation, which is located along the center line of vertical shaft 18. Curved blades 32 are spaced closely enough to one another such that their leading edges 36 and 38 overlap the apexes of curvature 40 of the next adjacent upwind or upstream blades 32, which is best viewed in FIG. 2 at the location designated by the numeral 42. As used further herein and in the claims, the terms "upstream" and "downstream" represent the relative direction of the fluid flow with respect to the present invention, regardless of the type of fluid medium, and have the same meaning as the terms "upwind" and "downwind," respectively, when used in reference to a fluid flow consisting of a gaseous medium.

Blades 32 may be attached to central hub 12 by any known method, only being dependent upon the size of the blades and the materials used for the blades and central hub. The illustrated method of attaching blades 32 to central hub 12 is by use of an adhesive material, which is applied at the locations designated by the numeral 44 and other similar locations in the fluid rotor assembly 10.

The fluid rotor assembly 10 illustrated in FIG. 2 provides a total of ten blades 32. With such a configuration, at least two blades 32 are always facing into the direction of the fluid regardless from which direction the fluid is flowing. A minimum of two blades always facing into the direction of the fluid is preferred, so that fluid rotor assembly 10 will always rotate in the correct direction of rotation 30 in the event of a fluid speed sufficient to turn the blades 32. The shape of each of the blades 32 is such that it efficiently captures the fluid flowing against its open side, (which is designated by the numeral 46), and is very inefficient at capturing the fluid that flows against its closed side, (which is designated by the numeral 48). This disparity of efficiencies in capturing the fluid (and, correspondingly, producing mechanical movement) is what allows fluid rotor assembly 10 to effectively produce the proper direction of rotation 30 regardless of the incoming fluid direction. By temporarily capturing fluid on the open side 46 of blade 32, the pressure thereby created at open side 46 will be greater than the pressure created at the closed side 48, thus producing mechanical movement of blade 32 in the direction from open side 46 towards closed side 48.

The overall height of each blade 32, from its upper leading edge 36 to its lower leading edge 38 is shown in FIG. 1 by the letter "H". The width of each blade 32 is shown (in FIGS. 1 and 2) by the letter "W". The ratio of the height "H" of blade 32 to the width "W" is preferably in the range of 1:1 to 2:1.

FIG. 3 depicts a multi-layer fluid rotor assembly, designated by the numeral 60. Each "layer" is a separate fluid rotor assembly, generally indicated by the numeral 70, and comprises a multiple set of blades 32, a top coupling 72, and a bottom coupling 74. Vertical shaft 64 extends through the top and bottom couplings 72 and 74, respectively, of all the layers of fluid rotor assemblies 70. Vertical shaft 64 is affixed to each of the fluid rotor assemblies 70 via the top and bottom couplings 72 and 74, and rotates in unison with those fluid rotor assemblies. A fixed vertical shaft 66 is mounted within the hollow space of rotatable shaft 64, thereby providing a bearing surface around which rotatable shaft 64 rotates. The top portion (not shown) of fixed vertical shaft 66 is tapered, and abuts a bearing pad (not shown) which is affixed to the top, inner horizontal surface of rotatable shaft 64. This type of vertical shaft mounting configuration is known in the art, and is disclosed in U.S. Pat. No. 4,960,363 and No. 5,088,884, both by Bergstein.

Each of the fluid rotor assemblies 70 has a plane of rotational movement, designated by dashed lines 62, for each of their respective sets of blades 32. As related above, the leading edges 36 and 38 of each of blades 32 can overlap the apex of curvature 40 of the next adjacent upstream blades in each layer of fluid rotor assembly 70, thereby allowing for a high density of blades 32 within a single plane of rotation 62. In addition, the number of layers of fluid rotor assemblies 70 is constrained only by mechanical strength requirements and physical size limitations for a particular installation.

The profile of each of the blades 32 is determined by the ratio of the blade's height "H" and the blade's width "W". In the illustrated embodiment of FIG. 3, this profile is equal for each of the layers of fluid rotor assemblies 70. This need not be the case, and the profile for each individual layer of fluid rotor assembly 70 can have a different profile ratio as desired, depending upon the physical size limitations and fluid velocity characteristics of a given installation. Again, as related above, the upper layers of fluid rotor assemblies 70 can have blades 32 with much larger heights (dimension "H"). On the other hand, if space allows, the upper layers can also have much larger widths (dimension "W"), which would call for an increase in the overall diameter of multi-layer fluid rotor assembly 60, constrained only by physical size limitations of a particular installation.

An alternative shape for the central hub is illustrated in FIG. 4. Rather than having a circular cross-section, as in the central hub 12 of the fluid rotor assembly 10, FIG. 4 depicts a fluid rotor assembly 80 which uses a central hub 82 having a decagonal shape. Each of the "sides" of the decagon is a facet 86 exhibiting a flat surface. Blades 32 may be attached to each facet 86 of central hub 82 by any known method, only being dependent upon the size of the blades and the materials used for the blades and central hub. As can be seen in FIG. 4, the major portion of the inner edge of each blade 32 can abut the facet 86, thereby allowing for an attachment means having greater mechanical strength.

The illustrated method of attaching blades 32 to each facet 86 is by use of an adhesive material, which is applied at the locations designated by the numeral 44 and other similar locations in the fluid rotor assembly 80. In this configuration, a greater proportion of each blade 32 can be adhesively attached to the central hub 82 as compared to the proportion of each blade 32 which is attached to central hub 12 (as best seen in FIG. 2), thereby providing greater mechanical strength.

The longitudinal axis 84, at the apex of curvature 40 of each blade 32, of central hub 82 is somewhat offset from the centerline of central hub 82 (as can be viewed in FIG. 4). This is in comparison to the longitudinal axes 34 of the blades 32 of central hub 12 (as viewed in FIG. 2), which intersect the centerline of central hub 12. This difference in construction does not affect the efficiency of operation of fluid rotor assembly 80 as compared to that of fluid rotor assembly 10.

The other details of construction of fluid rotor assembly 80 are similar to fluid rotor assembly 10, including the use of cross-members 14, 20, and 22, and having a bearing surface 16 at the upper tip of vertical shaft 18. At least two blades 32 are always facing into the fluid, regardless of the fluid's direction, and the preferred ratio of blade height "H" to blade width "W" is in the range of 1:1 to 2:1. The blades 32 are closely spaced, and overlap adjacent upstream blades at locations designated by the numeral 42, creating a high density of blades within one plane of rotation.

The fluid rotor assembly 80 will always rotate in the correct direction of rotation 30 regardless of the direction of the incoming fluid, in the event of a fluid speed sufficient to turn the blades 32. This occurs since the blades 32 are of a curved shape to efficiently capture the fluid on their open sides, but not on their closed sides. By temporarily capturing fluid on the open side of blade 32, the pressure thereby created at that open side will be greater than the pressure created at the closed side, thus producing mechanical movement of blade 32.

If desired, a fluid rotor assembly having a faceted central hub could be constructed with more than ten facets and blades. For example, the central hub could have the shape of a twelve-sided dodecagon (not shown), having a corresponding twelve blades 32. Using such construction, the fluid rotor assembly would have three blades always facing into the incoming fluid, and would always rotate in the correct direction of rotation due to the curved shape of the blades 32.

FIG. 5 depicts another multi-layer fluid rotor assembly, generally designated by the numeral 100. Each "layer" is a separate fluid rotor assembly, indicated by either the numeral 70 or 110, which include a multiple set of blades 32 or 120, respectively. The lower fluid rotor assemblies 110 are immersed in a liquid 102, such as water, and the level of the liquid is depicted as a waterline 104.

The upper fluid rotor assemblies 70 each have their blades 32 mounted upon a central hub 12 which is mounted to vertical shaft 122 by use of a top coupling 72 and a bottom coupling 74. As blades 32 turn, they impart a direction of rotation designated by the arrow 170 onto vertical shaft 122. This portion of fluid rotor assembly 100 is very similar to the multiple-layer fluid rotor assembly 60, described hereinabove. Vertical shaft 122 is affixed to each of the fluid rotor assemblies 70 via the top and bottom couplings 72 and 74, and rotates in unison with those fluid rotor assemblies. A fixed vertical shaft 126 is mounted within the hollow space of rotatable shaft 122, thereby providing a bearing surface around which rotatable shaft 122 rotates.

The fluid rotor assemblies 110 have blades 120 which are virtually identical to blades 32 of the fluid rotor assemblies 70. Blades 120 must, of course, be able to operate within the confines of the properties of the liquid 102, such as salt water from the ocean. Blades 120 are attached to a central hub 112, which is mounted to a rotatable vertical shaft 124 by use a top coupling 114 and a bottom coupling 116 per fluid rotor assembly 110. Vertical shaft 124, being affixed to each of the fluid rotor assemblies 110 via the top and bottom couplings 114 and 116, rotates in unison with those fluid rotor assemblies as the liquid media 102 turns blades 120, in the direction of rotation designated by arrow 172.

Vertical shaft 124 extends through the top and bottom couplings 114 and 116, respectively, of all fluid rotor assemblies 110. A fixed vertical shaft 126 is mounted within the hollow space of rotatable shaft 124, thereby providing a bearing surface around which rotatable shaft 124 rotates. It will be understood that the materials used for the top and bottom couplings 114 and 116, and for the bearing surface of shaft 126 must also be able to withstand the chemical reaction of liquid medium 102.

Rotatable shaft 122 continues through a right-angle drive assembly 190 (described below) and becomes rotatable shaft 123. It will be understood that if rotatable shaft 123 were directly coupled to rotatable shaft 124, which is fixedly attached to the fluid rotor assembly 110 immersed in the liquid media 102, then the potential exist for liquid media 102 to act as an "anchor" if liquid media 102 is not moving very rapidly as compared to the movement of the gaseous media above. To avoid any type of anchoring effect, a one-way clutch assembly 130 is provided between rotatable shafts 123 and 124. One-way clutch 130 could be made of several types of single direction mechanical assemblies, including a simple ratchet.

Figure 6:
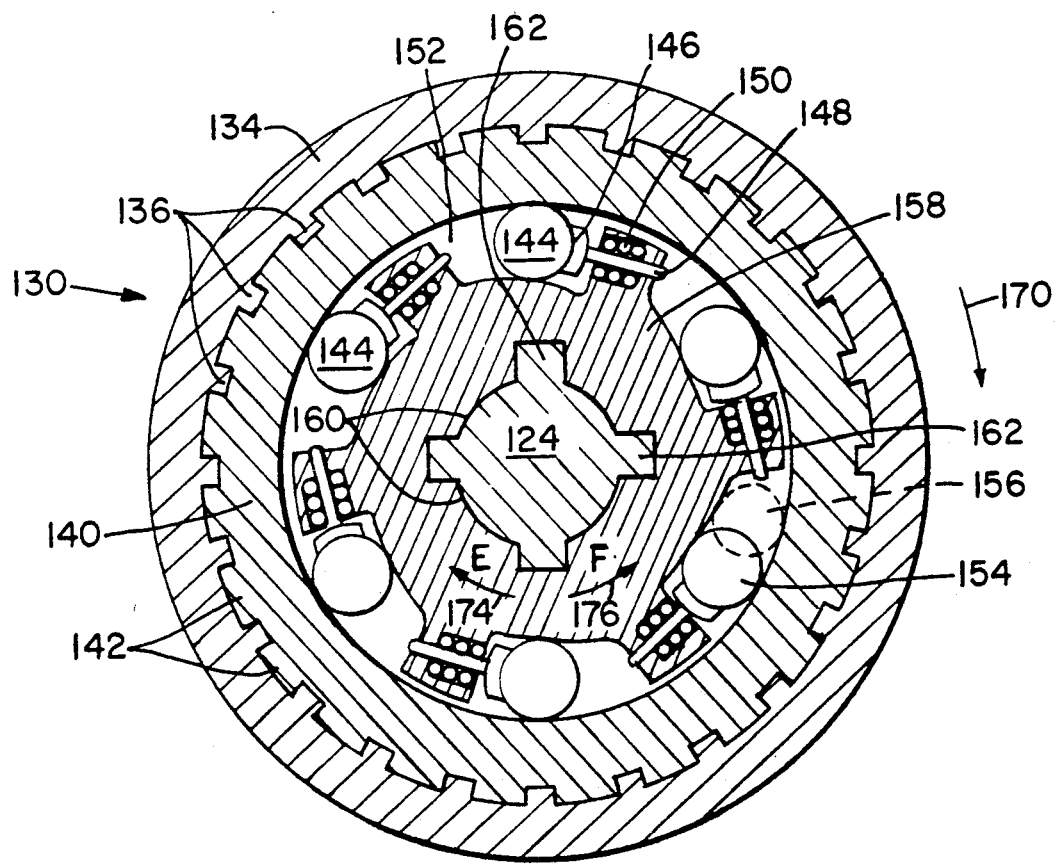
FIG. 6 is a top plan view of a cross-section of the one-way clutch of the fluid rotor apparatus of FIG. 5, taken along the section line 6—6.

The preferred one-way clutch assembly 130 is an overrunning type of device in which a central shaft is the "driver" portion of the assembly, and its outer rim is the "driven" portion of the assembly. Referring to FIG. 5, rotatable shaft 123 is attached to a tapered portion 132 which expands the outer diameter of the rotatable shaft to a portion 134 which fits over the outer rim of one-way clutch 130. As best viewed in FIG. 6, this large outer diameter portion 134 has internal spline 136 which mate to external spline 142 of the rim 140 of clutch assembly 130. FIG. 6 is a top view, and the larger diameter portion of 134 has a direction of rotation as shown designated by arrow 170. As related above, one-way clutch assembly 130 preferably is an overrunning type of clutch in which rotatable shaft 124 is the driving member and can impart a rotation to the rim 140, which, in turn, will impart a rotation via its spline 142 to the larger outer diameter portion 134. Rotatable shaft 124 has external spline 162 which engage mating internal spline 160 of an inner coupling 158.

If inner coupling 158 rotates in the direction given by arrow 176 (or "F"), then the rim 140 will freewheel and will not be rotated along with inner coupling 158. This freewheeling action is allowed to occur because the rollers 144 remain in the position shown in FIG. 6, in which rollers 144 remain in the position designated by index numeral 154. In position 154, rollers 144 are allowed to rotate freely in the chamber 152 between rim 140 and inner coupling 158, thereby permitting the freewheeling action to occur. Rollers 144 have a land 146 with an extension 148 that are positioned to allow a spring 150 to impart a force against each of the rollers 144.

On the other hand, if inner coupling 158 rotates in the opposite direction, designated by arrow 174 (or "E"), then the rollers 144, aided by the spring action of springs 150, will tend to move within their wedge shaped chambers 152 into a second position, generally designated by the index numeral 156. As each roller 144 moves within the chamber 152, the roller 144 will become seated against the outer side portion of inner coupling 158 and the inner diameter side portion of rim 140. When this occurs, rim 140 can no longer freewheel with respect to inner coupling 158, and these two portions of clutch 130 become engaged. After this engagement occurs, rim 140 will rotate at the same speed and direction as inner coupling 158. This type of one-way clutch is well known in the art.

Rotating direction arrows 174 and 176 are not absolute directions of rotation of inner coupling 158. Since the larger outer diameter portion 134 will almost always be rotating in direction 170 due to the wind action of the gaseous media against blades 32 of wind rotor assembly 70, the direction arrows 174 and 176 represent relative motion between the direction of motion 170 of rotatable shaft 123 above the water line 104 as compared to the direction of motion 172 of rotatable shaft 124 below the water line 104. If the liquid imparts a speed of rotation to rotatable shaft 124 at least as great as the speed of rotation imparted by gas to rotatable shaft 123, then one-way clutch assembly 130 will be engaged, and rim 140 will be forced to rotate at the same rate as inner coupling 158. On the other hand, if the speed of rotation of rotatable shaft 123 above water line 104 is greater than the speed of rotation of the rotatable shaft 124 below the water line 104, then the operation of one-way clutch assembly 130 will be freewheeling, and upper rotatable shaft 123 will be allowed to turn at a higher rate of revolutions per minute than lower rotatable shaft 124.

Figure 7:
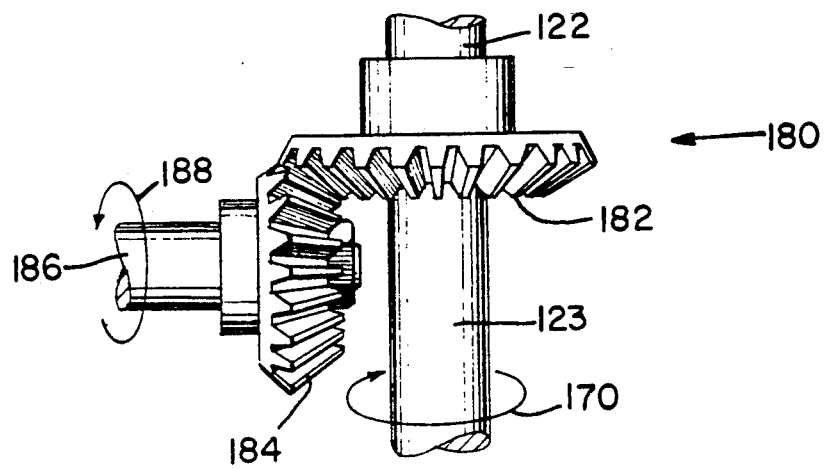
FIG. 7 is a elevation view of an optional 90° drive assembly that can be used in the fluid rotor apparatus of FIG. 5.

A right-angle drive assembly 190 is provided so as to output the torque and power generated by the rotation of the various wind rotor assemblies 70 and 110. It will be understood that other types of right-angle drives could be used in lieu of the worm gear right-angle drive assembly 190 depicted in FIG. 5, including a gear set such as depicted in FIG. 7. In FIG. 5, the worm gear teeth 192 on rotatable shaft 122 impart a rotation onto mating gear teeth 194 of a horizontal drive worm gear 196. Horizontal worm gear 196, in turn, drives a horizontal output shaft 198 in the direction given by arrow 188 when rotatable shaft 122 rotates in the direction of rotation given by arrow 170.

In FIG. 7, right-angle drive assembly 180 includes gear teeth 182 on rotatable shaft 122, which mate with right-angle gear teeth 184 that are attached to a horizontal drive shaft 186. When rotatable shafts 122 and 123 rotate in the direction of arrow 170, they impart a rotation on horizontal output shaft 186 in the direction designated by arrow 188. This method for providing a 90° coupling is well known in the art.

Since rotatable shaft 122 will turn at the faster speed of either the wind driven fluid rotor assembly 70 or the liquid driven fluid assembly 110, it will always impart the maximum speed to its worm gear teeth 192 that is available to fluid rotor assembly 100. In turn, worm gear 196 and horizontal output shaft 198 are driven at the maximum speeds available to fluid rotor assembly 100. An ideal location of fluid rotor assembly 100 is either along a stream or river, or along the beach of an ocean. Since the blades 120 of the fluid rotor assembly 110 will rotate in direction 172 regardless of the direction of the liquid media 102, any wave action or undertow of an ocean will assist the rotation of such fluid rotor assemblies 110. As described above, the direction of the wind is not important, since wind blowing from any direction will assist in rotating fluid rotor assembly 70. By proper use of fluid rotor assembly 100, the most efficient scheme of capturing both wind and water power can be achieved.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described in order to best illustrate the principles of the invention and its practical application to thereby enable one of ordinary skill in the art to best utilize the invention in various embodiments and with various modifications as are suited to the particular use contemplated. It is intended that the scope of the invention be defined by the claims appended hereto.

I claim:
1. A fluid rotor comprising:
   (a) a central hub having a vertical axis of rotation and an outer surface;
   (b) means for mounting said central hub for rotation about said vertical hub axis of rotation; and
   (c) a plurality of curved blades, each of said blades having upper and lower leading edges and first and second curved side edges, each blade having a substantially uniform width between said first and second side edges, and each blade being rigidly attached to said outer surface of said central hub along said first curved side edge.

2. A fluid rotor as recited in claim 1, wherein said central hub has a generally cylindrical shape.

3. A fluid rotor as recited in claim 1, wherein said central hub has the shape of a polygon in which the outer surface of said hub is faceted, and each of said blades is rigidly attached to said hub at one of its facets along a major portion of the first curved side edge of the blade.

4. A fluid rotor as recited in claim 3, wherein the polygon shape of said central hub is a decagon having ten facets, and a blade is rigidly attached to said hub at each one of its ten facets along a major portion of the first curved side edge of the blade.

5. A fluid rotor as recited in claim 1, wherein each blade of said plurality of curved blades has an adjacent upstream blade and an adjacent downstream blade, and wherein each blade of said plurality of curved blades is so closely spaced to its adjacent blades that the upper and lower leading edges of each blade overlap the apex of curvature of each adjacent upstream blade.

6. A fluid rotor as recited in claim 1, each of said blades having an open side and a closed side, wherein each blade of said plurality of curved blades is so closely spaced to its adjacent blades such that there are always at least two blades having their open sides facing into the direction of the fluid flow regardless from which direction the fluid is flowing.

7. A fluid rotor as recited in claim 1, wherein each blade of said plurality of curved blades has a width, which is the blade's leading edge dimension that is perpendicular to the direction of rotation of said fluid rotor, and has a semi-circular shape, when viewed from its outer second curved side edge, and wherein the ratio of the diameter across the semi-circular shape of each blade to the width of said blade is in the range of 1:1 to 2:1.

8. A fluid rotor, comprising:
(a) a first rotatable vertical shaft, and a second rotatable vertical shaft;
(b) a first rotor subassembly immersed in a liquid, comprising:
(i) a first central hub having a vertical axis of rotation and an outer surface, said first central hub being fixedly attached to said first shaft;
(ii) a first plurality of curved blades, each of said blades having upper and lower leading edges and first and second curved side edges, each blade having a substantially uniform width between said first and second side edges, and each blade being rigidly attached to said outer surface of said first central hub along said first curved side edge;
(c) a second rotor subassembly immersed in a gas, comprising:
(i) a second central hub having a vertical axis of rotation and an outer surface, said second central hub being fixedly attached to said second shaft;
(ii) a second plurality of curved blades, each of said blades having upper and lower leading edges and first and second curved side edges, each blade having a substantially uniform width between said first and second side edges, and each blade being rigidly attached to said outer surface of said second central hub along said first curved side edge;
(d) wherein each of said first and second rotor subassemblies is fixedly attached to its respective said first and second shafts at different vertical elevations with respect to each other, and said first and second shafts are commonly coupled; and
(e) wherein the blades of each of said first and second rotor subassemblies are curved in the same direction.

9. The fluid rotor as recited in claim 8, further comprising means for driving an output shaft at a 90° angle from one of said first shaft or said second shaft.

10. The fluid rotor as recited in claim 8, further comprising means for coupling said first shaft and said second shaft such that said second shaft will rotate faster than and free of said first shaft when said second rotor is being rotated by said gas faster than said first rotor is being rotated by said liquid, and said second shaft will rotate at the same speed as and be driven by said first shaft when said first rotor is being rotated by said liquid faster than said second rotor is being rotated by said gas.

11. The fluid rotor as recited in claim 10, wherein said means for coupling said first shaft and said second shaft comprises a one-way clutch.

12. The fluid rotor as recited in claim 10, wherein said means for coupling said first shaft and said second shaft comprises a ratchet.

13. A method for convening the movement of fluid into rotational mechanical movement, comprising the steps of:
(a) providing a first rotatable vertical shaft and a first central hub fixedly attached to said first shaft, said first hub having an axis of rotation along the centerline of said first shaft, said first hub having an outer surface;
(b) providing a first plurality of curved blades, each of said blades having upper and lower leading edges and first and second curved side edges, each said blade having a substantially uniform width between said first and second curved side edges, each said blade being rigidly attached to the outer surface of said first hub along said first curved side edge;
(c) temporarily capturing moving liquid against said first plurality of curved blades, wherein the shape of each of said plurality of curved blades captures moving liquid more efficiently on the open side of the blade than on the closed side of the blade, thereby providing said rotational mechanical movement in the direction of rotation from the open side of each blade toward its closed side regardless of the direction of the incoming moving liquid;
(d) providing a second rotatable vertical shaft and a second central hub fixedly attached to said second shaft, said second hub having an axis of rotation along the centerline of said second shaft, said second hub having an outer surface;
(e) providing a second plurality of curved blades, each of said blades having upper and lower leading edges and first and second curved side edges, each said blade having a substantially uniform width between said first and second curved side edges, each said blade being rigidly attached to the outer surface of said second hub along said first curved side edge;
(f) temporarily capturing moving gas against said second plurality of curved blades, wherein the shape of each of said plurality of curved blades captures moving gas more efficiently on the open side of the blade than on the closed side of the blade, thereby providing said rotational mechanical movement in the direction of rotation from the open side of each blade toward its closed side regardless of the direction of the incoming moving gas;
(g) arranging said first plurality of curved blades and said second plurality of curved blades to cause rotation of said first shaft to be in the same direction as rotation of said second shaft; and
(h) turning an output shaft by at least one of said first shaft and second shaft.

14. The method as recited in claim 13, wherein said output shaft has a longitudinal axis forming 90° angle with the longitudinal axis of one of said first shaft or said second shaft.

15. The method as recited in claim 13, further comprising the step of coupling said first shaft and said second shaft such that said second shaft will rotate faster than and free of said first shaft when said second rotor is being rotated by said gas faster than said first rotor is being rotated by said liquid, and said second shaft will rotate at the same speed as and be driven by said first shaft when said first rotor is being rotated by said liquid faster than said second rotor is being rotated by said gas.

16. The method as recited in claim 15, wherein said coupling of said first shaft and said second shaft is accomplished using a one-way clutch.

17. The method as recited in claim 15, wherein said coupling of said first shaft and said second shaft is accomplished using a ratchet.

* * * * *